US010534069B2

(12) United States Patent
Asanuma

(10) Patent No.: US 10,534,069 B2
(45) Date of Patent: Jan. 14, 2020

(54) RADAR DEVICE AND SIGNAL PROCESSING METHOD

(71) Applicant: FUJITSU TEN LIMITED, Kobe-shi, Hyogo (JP)

(72) Inventor: Hisateru Asanuma, Kobe (JP)

(73) Assignee: FUJITSU TEN LIMITED, Kobe-shi (JP)

(*) Notice: Subject to any disclaimer, the term of this patent is extended or adjusted under 35 U.S.C. 154(b) by 364 days.

(21) Appl. No.: 15/493,521

(22) Filed: Apr. 21, 2017

(65) Prior Publication Data

US 2017/0363716 A1 Dec. 21, 2017

(30) Foreign Application Priority Data

Jun. 16, 2016 (JP) .................. 2016-120092

(51) Int. Cl.
| | |
|---|---|
| *G01S 7/35* | (2006.01) |
| *G01S 13/34* | (2006.01) |
| *G01S 13/93* | (2006.01) |
| *G01S 13/00* | (2006.01) |

(52) U.S. Cl.
CPC ............ *G01S 7/354* (2013.01); *G01S 13/341* (2013.01); *G01S 13/345* (2013.01); *G01S 13/931* (2013.01); *G01S 2007/356* (2013.01)

(58) Field of Classification Search
CPC ................................ G01S 7/35; G01S 7/4026
See application file for complete search history.

(56) References Cited

U.S. PATENT DOCUMENTS

| | | | | |
|---|---|---|---|---|
| 9,869,761 | B2* | 1/2018 | Yoshimura et al. | G01S 13/345 |
| 2003/0156055 | A1* | 8/2003 | Tamatsu ................ | G01S 13/345 |
| | | | | 342/70 |
| 2004/0125010 | A1* | 7/2004 | Natsume ............... | G01S 13/931 |
| | | | | 342/70 |
| 2004/0125011 | A1* | 7/2004 | Kumon ................. | G01S 13/345 |
| | | | | 342/70 |
| 2004/0252047 | A1* | 12/2004 | Miyake ................. | G01S 13/931 |
| | | | | 342/107 |

(Continued)

FOREIGN PATENT DOCUMENTS

| | | |
|---|---|---|
| JP | H11-258337 A | 9/1999 |
| JP | 2002-014165 A | 1/2002 |

(Continued)

*Primary Examiner* — Bernarr E Gregory
(74) *Attorney, Agent, or Firm* — Oliff PLC

(57) ABSTRACT

There is provided a radar device. An extracting unit extracts history peak signals according to estimated peak signals, from a difference frequency between a transmission signal and a reception signal obtained by receiving a reflected wave of a transmission wave based on the transmission signal from a target, in a first period and a second period. An estimating unit estimates current peak signals as the estimated peak signals based on extracted previous peak signals. A pairing unit pairs the history peak signal of the first period and the history peak signal of the second period. A re-pairing unit re-pairs the paired history peak signals, based on peak signals existing in a predetermined range including the paired history peak signals. An information generating unit generates information on the target based on a result of the pairing and a result of the re-pairing.

14 Claims, 9 Drawing Sheets

(56) References Cited

U.S. PATENT DOCUMENTS

| | | | | |
|---|---|---|---|---|
| 2005/0017891 A1* | 1/2005 | Kuroda | ............... | G01S 7/4026 342/70 |
| 2006/0109169 A1* | 5/2006 | Winter | ................ | G01S 13/345 342/70 |
| 2008/0272956 A1* | 11/2008 | Pedersen | .................. | G01S 7/35 342/107 |
| 2015/0204971 A1* | 7/2015 | Yoshimura | ........... | G01S 13/345 342/70 |

FOREIGN PATENT DOCUMENTS

| | | | | |
|---|---|---|---|---|
| JP | 2002-236170 A | 8/2002 | | |
| JP | 2003-167047 A | 6/2003 | | |
| JP | 2010-175256 A | 8/2010 | | |
| JP | 2014-196989 A | 10/2014 | | |
| JP | 2014206411 A | * 10/2014 | .......... | G01S 13/345 |
| JP | 2015-137915 A | 7/2015 | | |

* cited by examiner (CONT.)

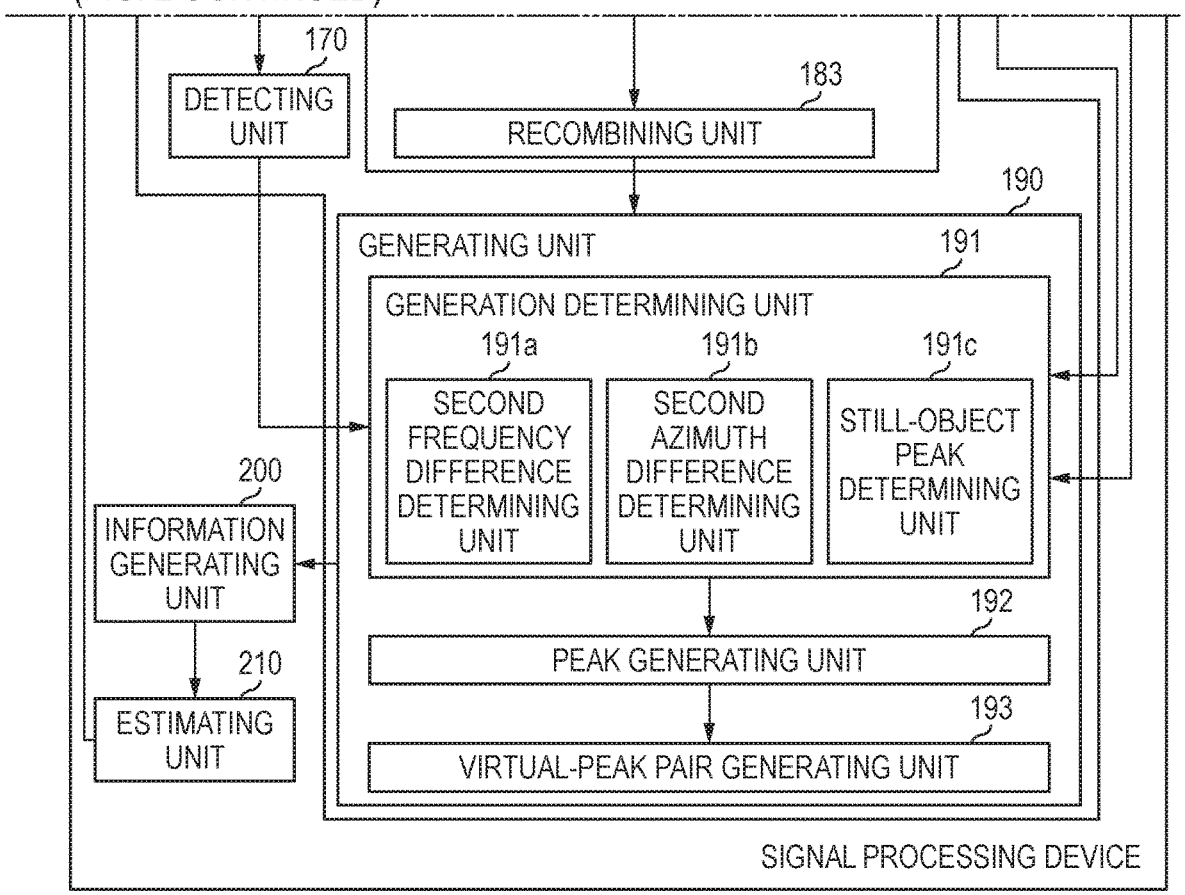

US 10,534,069 B2

RADAR DEVICE AND SIGNAL PROCESSING METHOD

CROSS-REFERENCE TO RELATED APPLICATIONS

This application is based on and claims priority from Japanese Patent Application No. 2016-120092 filed on Jun. 16, 2016.

TECHNICAL FIELD

The present invention relates to a radar device and a signal processing method.

RELATED ART

There is, for example, a radar device for detecting the distances from a vehicle equipped with the radar device to targets, and so on by transmitting a transmission wave from the vehicle and receiving reflected waves of the transmission wave from the targets.

When the radar device extracts a peak signal on the basis of the frequency difference between the transmission wave and a reflected wave, it extracts a peak signal (hereinafter, referred to as a history peak signal) in a predetermined frequency range including a current peak signal estimated on the basis of a peak signal (hereinafter, referred to as an estimated peak signal) extracted in the previous process. Also, in a case where there is a peak signal extracted for the first time in the current process (hereinafter, referred to as a new peak signal), the radar device determines whether there is any history peak signal in the vicinity of the new peak signal (see Patent Document 1 for instance).

Patent Document 1: Japanese Patent Application No. 2003-167047A

If extracting a new peak signal, the device of the related art determines whether there is any history peak signal in the vicinity of the new peak signal; however, the device does not consider a case of erroneously extracting the corresponding new peak signal as a history peak signal. If the new peak signal is erroneously detected as a history peak signal, during pairing of a history peak signal, mis-pairing may occur, resulting in a decrease in target detection.

SUMMARY

It is therefore an object of the present invention to provide a radar device and a signal processing method capable of suppressing a decrease in the accuracy of target detection.

In order to solve the above-described problem and achieve the object, there is provided a radar device comprising: an extracting unit configured to extract history peak signals according to estimated peak signals, from a difference frequency between a transmission signal in which a frequency varies in a predetermined cycle and a reception signal obtained by receiving a reflected wave of a transmission wave based on the transmission signal from a target, in a first period in which the frequency of the transmission signal increases and a second period in which the frequency decreases; an estimating unit configured to estimate current peak signals as the estimated peak signals on the basis of previous peak signals extracted by the extracting unit; a pairing unit configured to pair the history peak signal of the first period and the history peak signal of the second period; a re-pairing unit configured to re-pair the history peak signals paired by the pairing unit, on the basis of peak signals existing in a predetermined range including the history peak signals paired by the pairing unit; and an information generating unit configured to generate information on the target on the basis of a result of the pairing of the pairing unit and a result of the re-pairing of the re-pairing unit.

According to the present invention, it is possible to suppress a decrease in the accuracy of target detection.

BRIEF DESCRIPTION OF THE DRAWINGS

Exemplary embodiments of the present invention will be described in detailed based on the following figures, wherein.

DETAILED DESCRIPTION

Hereinafter, embodiments of a radar device and a signal processing method to be disclosed in this specification will be described in detail with reference to the accompanying drawings. However, the present invention is not limited by the following embodiments.

Figure 1:
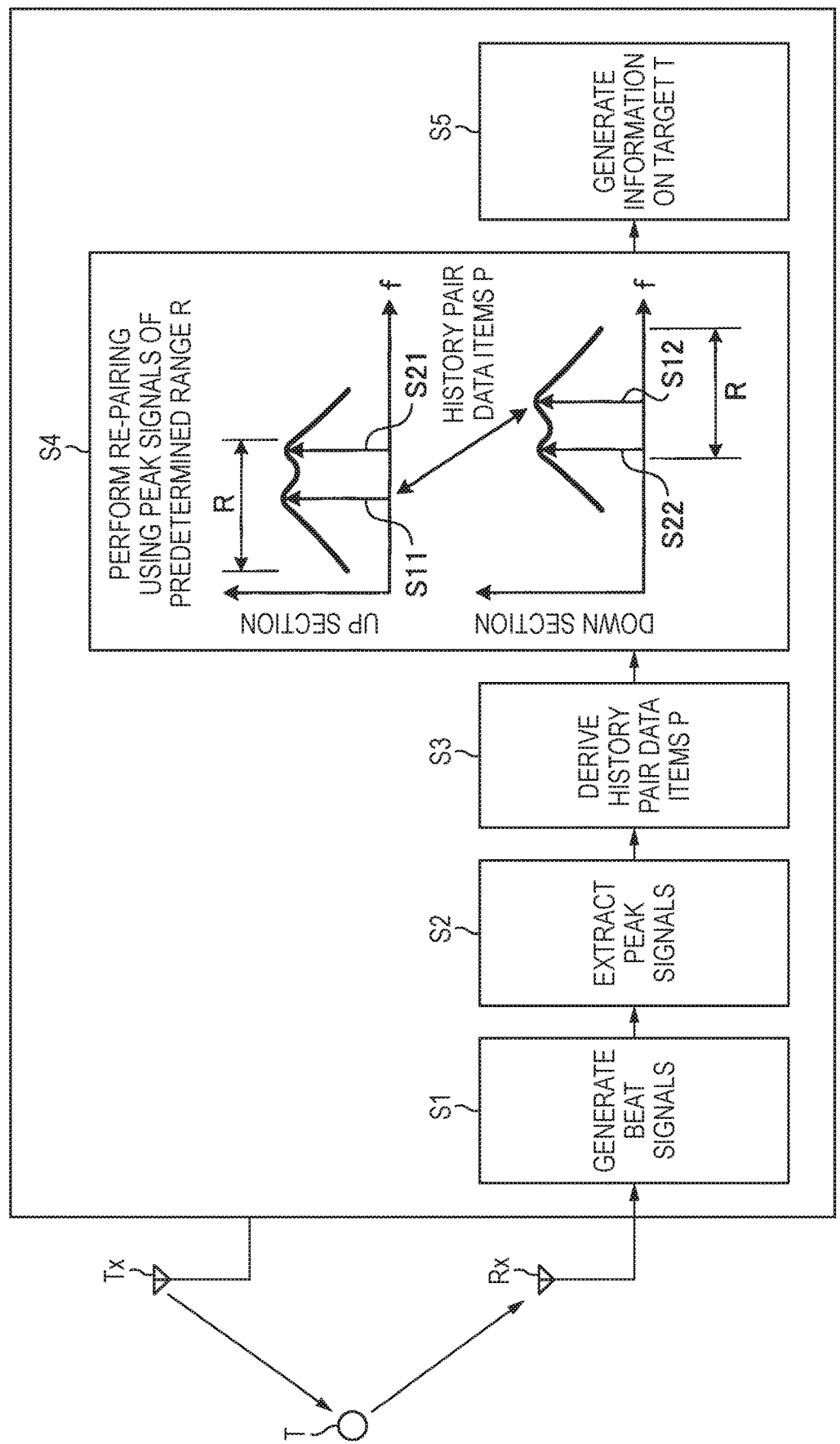
FIG. 1 is a view for explaining an overview of a signal processing method according to an embodiment of the present invention.

First, a signal processing method according to an embodiment will be described with reference to FIG. 1. FIG. 1 is a view for explaining an overview of the signal processing method according to the embodiment. Also, it is assumed that the signal processing method is performed by a radar device mounted on a vehicle C (not shown in the drawings, hereinafter also referred to as an own vehicle C).

Also, the radar device uses a so-called FMCW (frequency-modulated continuous-wave) system, and generates information on a target T on the basis of reflected waves. In this specification, a case where the target T is a preceding vehicle running in front of the own vehicle C will be described; however, the present invention is not limited thereto. For example, the target T may be a moving object such as a vehicle or a bicycle running behind the own vehicle C, or a pedestrian, or may be a still object such as a side stripe, a traffic light, a pole, or a guide rail.

Now, the signal processing method according to the embodiment will be described. According to this processing method, the radar device transmits a transmission wave in which frequency thereof changes in a predetermined cycle, from a transmitting antenna Tx and receives a reflected wave of the corresponding transmission wave from the target T by receiving antennae Rx.

Subsequently, in STEP S1, the radar device mixes a transmission signal corresponding to the transmission wave and a reception signal corresponding to the reflected wave, thereby generating beat signals. Specifically, the radar device generates beat signals based on the frequency difference (beat frequency) between the transmission signal and the reception signal, in the individual sections of a first period (hereinafter, referred to as an UP section) when the frequency increases in a predetermined cycle and a second period (hereinafter, referred to as a DOWN section) when the frequency decreases.

In STEP S2, the radar device performs fast Fourier transform (FFT) on the beat signals, thereby generating frequency domain signals (hereinafter, referred to as frequency beat signals), and extracts peak signals from the frequency beat signals. In STEP S3, the radar device pairs a peak signal S11 of the UP section and a peak signal S12 of the DOWN section on the basis of a predetermined condition, thereby deriving pair data items P.

Here, pairing is a process of associating a peak signal S11 of an UP section and a peak signal S12 of a DOWN section belonging to the same target. The radar device performs such association, thereby deriving the distance, relative velocity, angle, and so on of the corresponding target. However, the radar device may perform a mis-pairing process of associating a peak signal S11 of an UP section and a peak signal S12 of a DOWN section belonging to different targets.

Also, the radar device estimates current peak signals as estimated peak signals on the basis of pair data items on the target T derived in the past, and extracts history peak signals included in a frequency range R0 having a width W0 and including the corresponding estimated peak signals. The radar device pairs the extracted history peak signals, thereby generating current history pair data items P on the target T. In the example shown in FIG. 1, the radar device pairs a history peak signal S11 and a history peak signal S12, thereby generating history pair data items P.

At this time, for example, a plurality of peak signals corresponding to a plurality of targets belonging to the same object may be extracted in a predetermined frequency section. Specifically, in some cases like a case of receiving a wave reflected from a rear part (for example, a backdoor) of a preceding vehicle and a wave reflected from a bottom part (for example, an undercover) and a road, there is a plurality of peak signals in a relatively narrow frequency range. In this case, the radar device may pair wrong peak signals.

The reason is as follows. In a case where the radar device receives reflected waves from a plurality of reflecting points of one vehicle, it detects a plurality of peak signals according to the plurality of reflected waves. In this case, a peak signal (a history peak signal) of the current process belonging to the same target as a peak signal detected in the previous process may be extracted, or a peak signal (a new peak signal) undetectable in the previous process and detected for the first time in the current process may be extracted.

For example, a history peak signal is extracted on the basis of a reflected wave from a rear part of one vehicle, and a new peak signal is extracted by a reflected wave from a bottom part of the same vehicle. Further, if the power of a plurality of reflected waves from one vehicle exceeds a predetermined threshold, a history peak signal and a new peak signal are extracted. However, if the plurality of reflected waves is synthesized, for example, the history peak signal may shift to a frequency on one side of the low frequency side and the high frequency side from its original frequency.

In this case, the frequency of an estimated peak signal for estimating the frequency of a history peak signal of the next process from the history peak signal becomes a frequency different from the original frequency. As a result, mis-pairing may occur. In other words, since the estimated peak signal has a frequency different from the original frequency, a range different from the frequency at which the history peak signal exists is used as a predetermined frequency range for extracting a history peak signal. Further, in a case where a new peak signal existing at a frequency close to the frequency of the history peak signal is in the predetermined frequency range, the new peak signal is erroneously extracted as a history peak signal.

As a result, mis-pairing may occur. For example, the new peak signal of the UP section and the history peak signal of the DOWN section may become subjects of pairing, or the history peak signal of the UP section and the new peak signal of the DOWN section may become subjects of pairing. As described above, if the radar device generates information on the target T on the basis of erroneous pair data items P, the corresponding information includes an error, whereby the target T is detected at a position different from its actual position, and the accuracy of detection of the target T decreases.

Also, according to the signal processing method of the present embodiment, in STEP S4, the radar device re-pairs the history peak signals S11 and S12 on the basis of peak signals S21 and S22 existing in a predetermined frequency range R including the history peak signals S11 and S12 included in the pair data items P.

In STEP S5, the radar device generates information on the target T on the basis of the result of the pairing of STEP S3 and the result of the re-pairing of STEP S4.

As described above, the radar device generates information on the target T in view of the peak signals S21 and S22 existing in the vicinity of the pair data items P. Therefore, it is possible to suppress the accuracy of detection of the target T from being decreased by mis-pairing. Hereinafter, the radar device which performs the signal processing method will be further described.

Figure 2:
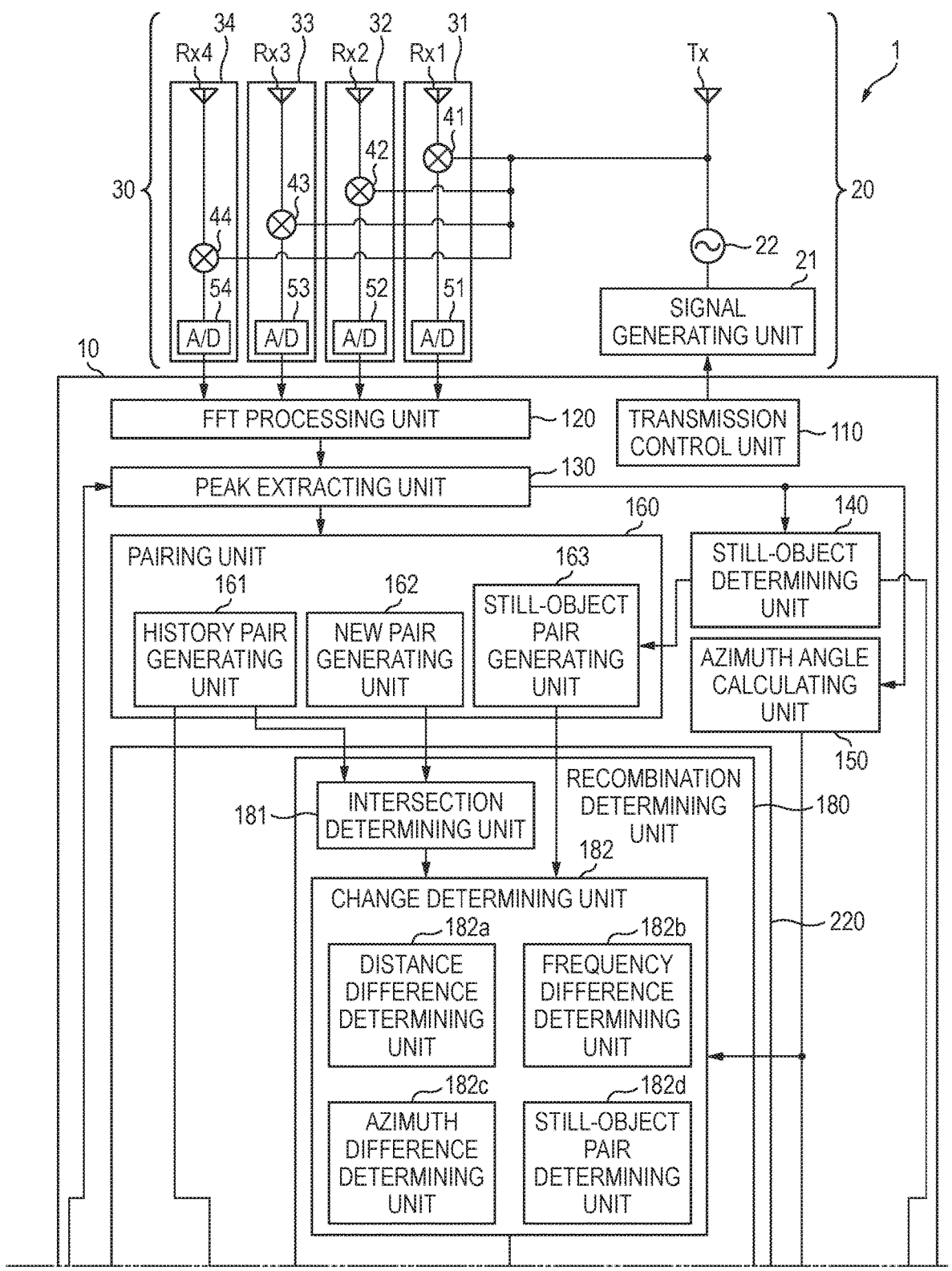
FIG. 2 is a view illustrating the configuration of a radar device according to the embodiment of the present invention.

FIG. 2 is a view illustrating the radar device 1 according to the embodiment of the present invention. The radar device 1 includes a signal processing device 10, a signal transmitting unit 20, and a signal receiving unit 30.

The signal transmitting unit 20 includes a signal generating unit 21, an oscillator 22, and a transmitting antenna Tx. The signal generating unit 21 generates a modulation signal in a triangular waveform, and supplies the modulation signal to the oscillator 22.

The oscillator 22 generates a transmission signal by performing frequency modulation on a continuous-wave signal on the basis of the modulation signal generated by the signal generating unit 21, and outputs the transmission signal to the transmitting antenna Tx. The transmitting antenna Tx transmits the transmission signal input from the oscillator 22, as a transmission wave, for example, in the traveling direction of the own vehicle C.

The signal receiving unit 30 includes, for example, four receiving antennae Rx1 to Rx4 (hereinafter, collectively referred to as the receiving antennae Rx), and individual signal receiving units 31 to 34 connected to the receiving antennae Rx, respectively. The receiving antennae Rx receive reflected waves of the transmission wave from the target T, as reception signals.

The individual signal receiving units 31 to 34 include mixers 41 to 44 and A/D conversion units 51 to 54, and perform various processes on the reception signals received through the receiving antennae Rx. The mixers 41 to 44 mix the reception signals with the transmission signal input from the oscillator 22, thereby generating beat signals representing frequency differences between the reception signals and the transmission signal. The A/D conversion units 51 to 54 convert the beat signals generated by the mixers 41 to 44 into digital signals, and output the digital signals to the signal processing device 10.

Although the case where the individual signal receiving units 31 to 34 include the mixers 41 to 44 and the A/D conversion units 51 to 54 has been described, the present invention is not limited thereto. For example, the individual signal receiving units 31 to 34 may include amplifiers and filters (not shown in the drawings).

The signal processing device 10 is a micro computer including a central processing unit (CPU), a storage unit (not shown in the drawings), and so on, and controls the whole of the radar device 1. The signal processing device 10 includes a transmission control unit 110, an FFT processing unit 120, a peak extracting unit 130, a still-object determining unit 140, an azimuth angle calculating unit 150, a pairing unit 160, a re-pairing unit 220, an information generating unit 200, and an estimating unit 210, as functions which can be implemented in a software wise by the micro computer.

The transmission control unit 110 controls modulation signal generating timings of the signal generating unit 21 of the signal transmitting unit 20, and so on. The FFT processing unit 120 performs FFT on the beat signals output from the individual signal receiving units 31 to 34, thereby converting the beat signals into frequency beat signals of the frequency domain.

The peak extracting unit 130 extracts a peak signal of the UP section and a peak signal of the DOWN section in the predetermined frequency range RO according to the estimated peak signals estimated by the estimating unit 210. Hereinafter, the peak signal of the UP section and the peak signal of the DOWN section will be referred to as the UP peak signal and the DN peak signal. Also the UP peak signal and the DN peak signal extracted on the basis of the estimated peak signals will be referred to as the history UP peak signal and the history DN peak signal, respectively. The history UP peak signal and the history DN peak signal will be collectively referred to as history peak signals.

Specifically, the peak extracting unit 130 extracts beat signals having signal level values exceeding predetermined thresholds, as peak signals, from the frequency beat signals. The peak extracting unit 130 extracts the UP peak signal of the UP section included in the predetermined frequency range RO and the DN peak signal of the DOWN section included in the predetermined frequency range RO, from the extracted peak signals, and outputs the UP peak signal and the DN peak signal as a history UP peak signal and a history DN peak signal to the pairing unit 160.

Also, the peak extracting unit 130 outputs the peak signals except for the history UP peak signal and the history DN peak signal, as a new UP peak signal and a new DN peak signal to the pairing unit 160. The peak extracting unit 130 outputs all of the extracted peak signals to the still-object determining unit 140 and the azimuth angle calculating unit 150.

The still-object determining unit 140 calculates the relative velocity of the target T on the basis of the frequency difference between the UP peak signal and the DN peak signal extracted by the peak extracting unit 130. The still-object determining unit 140 determines whether the UP peak signal and the DN peak signal are peak signals corresponding to a still object (hereinafter, referred to as still-object peak signals) on the basis of information on the velocity of the own vehicle C. The still-object determining unit 140 outputs the determination result to the pairing unit 160 and the re-pairing unit 220. Also, the still-object determining unit 140 may acquire the information on the velocity of the own vehicle C from a vehicle velocity sensor (not shown in the drawings) of the own vehicle C.

The azimuth angle calculating unit 150 calculates an azimuth angle on the basis of the peak signals in the UP section and the DOWN section. The azimuth angle calculating unit 150 calculates the azimuth angle, for example, by performing calculation using ESPRIT (Estimation of Signal Parameters via Rotational Invariance Techniques). The azimuth angle calculating unit 150 outputs the calculated azimuth angle to the re-pairing unit 220.

The pairing unit 160 performs a pairing process of pairing the UP peak signal and the DN peak signal. The pairing unit 160 includes a history pair generating unit (a first pair determining unit) 161, a new pair generating unit (a second pair determining unit) 162, and a still-object pair generating unit 163.

The history pair generating unit 161 performs a pairing process on the history UP peak signal and the history DN peak signal extracted by the peak extracting unit 130, thereby generating a history pair (a history peak pair). The new pair generating unit 162 performs a pairing process on the new UP peak signal and the new DN peak signal, thereby generating a new pair (a new peak pair).

Also, the still-object pair generating unit 163 performs a pairing process on the UP peak signal and the DN peak signal determined as still-object peak signals by the still-object determining unit 140, thereby generating a still-object pair.

The re-pairing unit 220 re-pairs a history peak signal on the basis of a new peak signal existing in the vicinity of the history peak signal. The re-pairing unit 220 includes a detecting unit 170, a recombination determining unit 180, and a generating unit 190.

In a case where the association on the frequency axis between the history peak signal of the UP section and the history peak signal of the DOWN section the association on the frequency axis between the new peak signal of the UP section and the new peak signal of the DOWN section intersect with each other, the recombination determining unit 180 determines to recombine the history pair and the new pair under a predetermined condition. If determining to recombine the history pair and the new pair under the predetermined condition, the recombination determining unit 180 of the re-pairing unit 220 performs re-pairing of the history peak signals included in the history pair, on the basis of the new peak signals existing near the history peak signals. The recombination determining unit 180 includes an intersection determining unit 181, a change determining unit 182, and a recombining unit 183.

Figure 3:
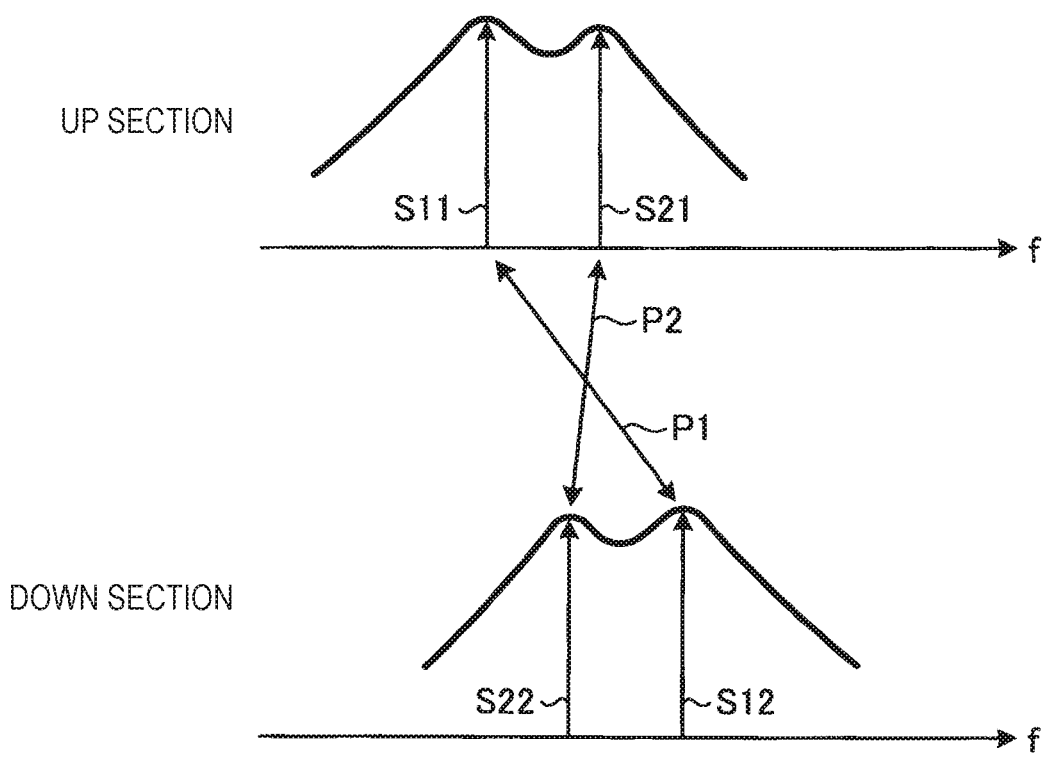
FIG. 3 is a schematic diagram illustrating the relation between a history pair and a new pair.

The intersection determining unit 181 determines whether the history pair and the new pair intersect with each other. As shown in FIG. 3, the intersection determining unit 181 determines whether the magnitude relation on the frequency axis between a history UP peak signal S11 and a history DN peak signal S12 included in a history pair P1 intersects with the magnitude relation on the frequency axis between a new UP peak signal S21 and a new DN peak signal S22 included in a new pair P2.

Specifically, the intersection determining unit 181 detects, for example, which side of the high frequency side and low frequency side of the history UP peak signal S11 the new UP peak signal S21 exists on. In the example shown in FIG. 3, the new UP peak signal S21 is on the high frequency side of the history UP peak signal S11.

In a case where the new DN peak signal S22 exists on the other side of the high frequency side and low frequency side of the history DN peak signal S12, the intersection determining unit 181 determines whether the history pair P1 and the new pair P2 intersect with each other. In other words, in a case where the new DN peak signal S22 and the new UP peak signal S21 are positioned on the same side, the intersection determining unit determines that the history pair and the new pair do not intersect with each other. In the example shown in FIG. 3, the new DN peak signal S22 is on the low frequency side of the history DN peak signal S12. Therefore, the intersection determining unit 181 determines that the history pair P1 and the new pair P2 intersect with each other. Also, FIG. 3 is a schematic diagram illustrating the relation between the history pair P1 and the new pair P2.

Referring to FIG. 2 again, in a case where the intersection determining unit 181 determines that the history pair P1 and the new pair P2 intersect with each other, according to whether a predetermined condition is satisfied, the change determining unit 182 determines whether to recombine the history pair P1 and the new pair P2. The change determining unit 182 includes a distance difference determining unit 182a, a frequency difference determining unit 182b, an azimuth difference determining unit 182c, and a still-object pair determining unit 182d.

Figure 4:
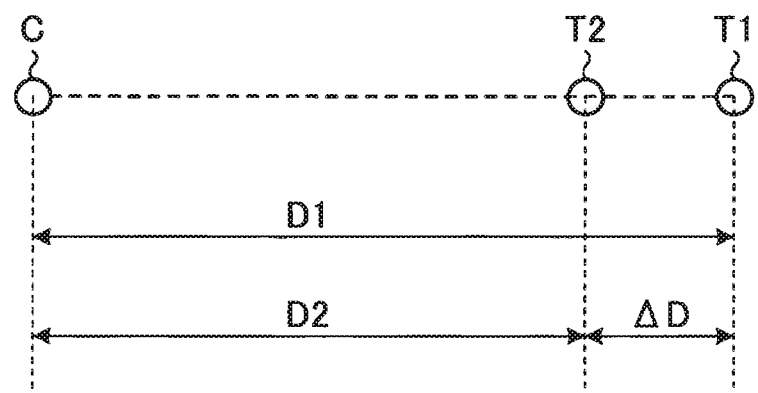
FIG. 4 is a schematic diagram for explaining a distance difference.

As shown in FIG. 4, the distance difference determining unit 182a calculates a distance difference ΔD between a distance D1 to a target T1 calculated on the basis of the history pair P1 and a distance D2 to a target T2 calculated on the basis of the new pair P2. In a case where the calculated distance difference ΔD is equal to or smaller than a first threshold Th1, the distance difference determining unit 182a determines to recombine the history pair P1 and the new pair P2. The first threshold Th1 is set to, for example, 1 m. Also, FIG. 4 is a schematic diagram for explaining the distance difference ΔD.

In a case where the distance D1 corresponding to the history pair P1 is significantly different from the distance D2 corresponding to the new pair P2, the target T1 corresponding to the history pair P1 and the target T2 corresponding to the new pair P2 are likely to correspond to different objects. Therefore, in a case where the distance difference ΔD between the two targets T1 and T2 is larger than the first threshold Th1, the distance difference determining unit 182a determines that the history pair P1 and the new pair P2 are different pair data items, and determines not to recombine the history pair P1 and the new pair P2. Therefore, it becomes difficult to erroneously recombine the history pair P1 and the new pair P2, and thus it is possible to further reduce mis-pairing of the history pair P1.

Figure 5:
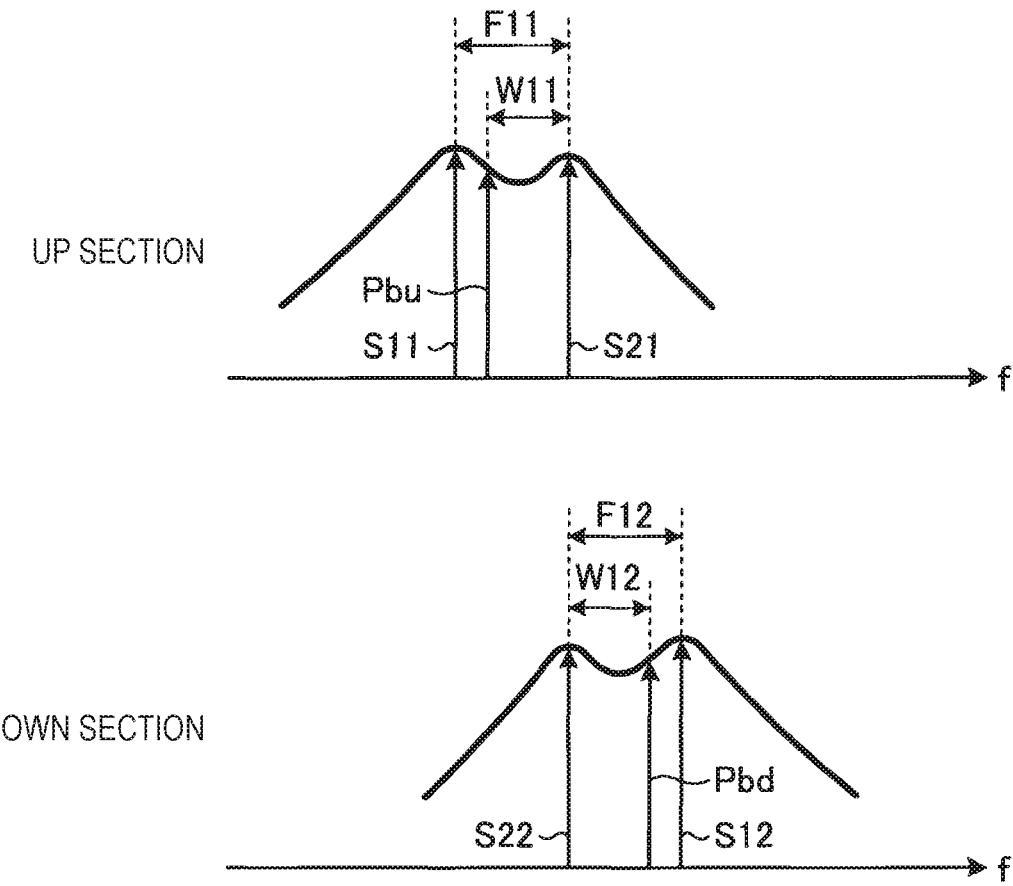
FIG. 5 is a schematic diagram for explaining frequency differences.

Subsequently, the frequency difference determining unit 182b calculates a frequency difference W11 between an estimated peak signal Pbu of the UP section estimated by the estimating unit 210 and the new UP peak signal S21 as shown in FIG. 5. Also, similarly, the frequency difference determining unit 182b calculates a frequency difference W12 between the estimated peak signal Pbd of the DOWN section estimated by the estimating unit 210 and the new DN peak signal S22. In a case where the calculated frequency differences W11 and W12 are equal to or smaller than a second threshold Th2, the frequency difference determining unit 182b determines to recombine the history pair P1 and the new pair P2. The second threshold Th2 is set to, for example, six BINs. Further, one BIN is about 468 Hz. Also, FIG. 5 is a schematic diagram for explaining the frequency differences.

In a case where the new UP peak signal S21 and the new DN peak signal S22 are significantly separated from the estimated peak signals, the new pair P2 are likely to correspond to a target different from a desired target. Therefore, pairs obtained by recombining the history pair P1 and the new pair P2 are likely to be erroneous pairs. In this case, the frequency difference determining unit 182b determines not to recombine the history pair P1 and the new pair P2. Therefore, it becomes difficult to erroneously recombine the history pair P1 and the new pair P2, and thus it is possible to further reduce mis-pairing of the history pair P1.

Referring to FIG. 2 again, the frequency difference determining unit 182b calculates a frequency difference F11 (see FIG. 5) between the history UP peak signal S11 and the new UP peak signal S21. The frequency difference determining unit 182b calculates a frequency difference F12 (see FIG. 5) between the history DN peak signal S12 and the new DN peak signal S22. In a case where the calculated frequency difference F11 and the calculated frequency difference F12 substantially coincide with each other, the frequency difference determining unit 182b determines to recombine the history pair P1 and the new pair P2.

In the case where the calculated frequency difference F11 and the calculated frequency difference F12 substantially coincides with each other, even if the association is changed, the distance and relative velocity of the history pair P1 and the new pair P2 are substantially maintained. Therefore, it is determined that the pairs P1 and P2 are likely to belong to the same object.

In a case where the difference in the left-right direction of the own vehicle C between the target T1 corresponding to the history pair P1 and the target T2 corresponding to the new pair P2 is equal to or smaller than a third threshold Th3, the azimuth difference determining unit 182c determines to recombine the history pair P1 and the new pair P2. The third threshold Th3 is set to, for example, 1.8 m corresponding to the width of the vehicle. In a case where the distance between the target T1 and the target T2 is equal to or larger than the width of the vehicle, the target T1 and the target T2 are likely to correspond to different objects, like a preceding vehicle and a vehicle running in a lane adjacent to the lane of the preceding vehicle.

Therefore, in the case where the difference in the left-right direction of the own vehicle C is larger than the third threshold Th3, the azimuth difference determining unit 182c determines not to recombine the history pair P1 and the new pair P2, thereby preventing erroneous pairing of the adjacent vehicle and the preceding vehicle. Therefore, it is possible to suppress erroneous recombination of the history pair P1 and the new pair P2.

Figure 6:
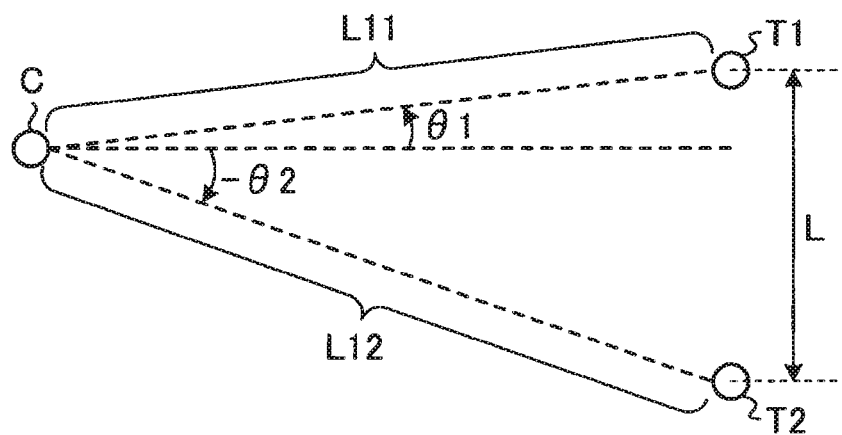
FIG. 6 is a view for explaining the correspondence relation between targets and azimuth angles.

As shown in FIG. 6, the difference in the left-right direction between the target T1 corresponding to the history pair P1 and the target T2 corresponding to the new pair P2 can be calculated on the basis of the azimuth angle of the history pair P1 and the azimuth angle of the new pair P2. Specifically, for example, a case where the azimuth angle of the history pair P1 is θ1, and the azimuth angle of the new pair P2 is −θ2, and the distance from the own vehicle C to the target T1 is L11, and the distance from the own vehicle C to the target T2 is L12 is considered.

In this case, the azimuth difference determining unit 182c calculates the difference L as L11 sin θ1+L12 sin θ2. If the calculated difference L is equal to or smaller than the third threshold Th3, the azimuth difference determining unit recombines the history pair P1 with the new pair P2. As described above, on the basis of the azimuth angle of the history pair P1 and the azimuth angle of the new pair P2, the azimuth difference determining unit 182c determines whether to recombine the history pair P1 and the new pair P2. Also, FIG. 6 is a view for explaining the correspondence relation between the targets T1 and T2 and the azimuth angles θ1 and θ2.

Referring to FIG. 2 again, the still-object pair determining unit 182d determines whether the new pair P2 are a still-object pair. Specifically, in a case where the new pair P2 coincide with pair data items paired by the still-object pair generating unit 163, the still-object pair determining unit 182d determines not to recombine the history pair P1 and the new pair P2. Therefore, the radar device 1 can suppress mis-pairing, that is, pairing of a still-object peak signal and a desired peak signal.

In a case where all of the distance difference determining unit 182a, the frequency difference determining unit 182b, the azimuth difference determining unit 182c, and the still-object pair determining unit 182d determine to recombine the history pair P1 and the new pair P2, the change determining unit 182 determines to recombine the history pair P1 and the new pair P2.

In the present embodiment, in the case where all of the individual units determine to recombine the history pair P1 and the new pair P2 by performing determination on the predetermined conditions, the change determining unit 182 determines to recombine the history pair P1 and the new pair P2; however, the present invention is not limited thereto. The change determining unit 182 may be configured to determine to recombine the history pair P1 and the new pair P2 in a case where at least one of the individual units determines to perform recombination.

In a case where the change determining unit 182 determines to recombine the history pair P1 and the new pair P2, the recombining unit 183 recombines the history pair P1 and the new pair P2.

In the case of recombining the history pair P1 and the new pair P2, The recombining unit 183 calculates the reliability of pairing after the recombination. The reliability of pairing is calculated, for example, on the basis of the angle difference or level difference between the UP peak signal and the DN peak signal.

In a case where the calculated reliability is lower than a predetermined threshold, the recombining unit 183 returns the recombined pairs to the history pair P1 and the new pair P2. In other words, the recombining unit 183 returns the recombined pairs to the history pair P1 and the new pair P2 before the recombination. In the present embodiment, the predetermined threshold is set to be smaller than a threshold for determining whether the history peak signals are a pair in a case where the history pair generating unit 161 performs pairing. In other words, the recombining unit 183 determines whether the pairs obtained by recombination under a condition stricter than that for the pairing of the history pair generating unit 161 are correct. Since the history pair generating unit 161 performs pairing of the history peak signals extracted on the basis of the estimated peak signals, a history UP peak signal and a history DN peak signal of a predetermined section are likely to be a pair. Also, the recombining unit 183 perform re-pairing of the history peak signals paired once by the history pair generating unit 161. Therefore, the recombining unit 183 determines the reliability of pairing after recombination under the condition stricter than that for the history pair generating unit 161, thereby suppressing erroneous pairs from being obtained by recombination.

As described above, if the recombining unit 183 returns the recombined pairs to the original pairs on the basis of the reliability, it becomes difficult to erroneously recombine the history pair P1 and the new pair P2, and it is possible to suppress mis-pairing.

Also, in the present embodiment, the recombining unit 183 performs recombination of the history pair P1 and the new pair P2, and then returns the recombined pairs to the original pairs; however, the present invention is not limited thereto. For example, before the recombining unit 183 performs recombination of the history pair P1 and the new pair P2, the reliability may be calculated, and in a case where the calculated reliability is equal to or higher than the predetermined threshold, recombination may be performed. Also, on the basis of the reliability, the change determining unit 182 may determine whether to perform recombination.

Also, in a case of recombining the history pair P1 and the new pair P2, for example, on the basis of the calculated reliability, the recombining unit 183 may set one pair of the recombined pairs as a recombined history pair P1, and set the other pair as a recombined new pair P2. For example, on the basis of the calculated reliability, the recombining unit 183 sets a pair having higher reliability as the recombined history pair P1, and sets a pair having lower reliability as the recombined new pair P2.

In a case where a plurality of peak signals is included in the predetermined frequency range based on the estimated peak signals, the detecting unit 170 detects the plurality of peak signals. From the plurality of detected peak signals, the detecting unit 170 detects peak signals except for the history peak signals of the history pair P1, in the UP section and the DOWN section, respectively. The detecting unit 170 outputs the detected peak signals as an adjacent UP peak signal and an adjacent DN peak signal (hereinafter, collectively referred to as adjacent peak signals) to the generating unit 190.

On the basis of the history pair obtained by the recombination of the recombination determining unit 180, and the adjacent UP peak signal and the adjacent DN peak signal detected by the detecting unit 170, the generating unit 190 generates virtual peak signals, and performs pairing of the virtual peak signals. In this way, the generating unit 190 performs re-pairing of the history peak signals included in the history pair, on the basis of the adjacent peak signals existing near the history pair, according to a predetermined condition. The generating unit 190 includes a generation determining unit 191, a peak generating unit 192, and a virtual-peak pairing unit 193.

The generation determining unit 191 determines whether to generate virtual peak signals. The generation determining unit 191 includes a second frequency difference determining unit 191a, a second azimuth difference determining unit 191b, and a still-object pair determining unit 191c.

In a case where a frequency difference W21 between the estimated peak signal Pbu of the UP section estimated by the estimating unit 210 and the adjacent UP peak signal is equal to or smaller than a fourth threshold Th4, the second frequency difference determining unit 191*a* determines to generate a virtual UP peak signal. Also, similarly, in a case where a frequency difference W22 between the estimated peak signal Pbd of the DOWN section estimated by the estimating unit 210 and the adjacent DN peak signal is equal to or smaller than the fourth threshold Th4, the second frequency difference determining unit 191*a* determines to generate a virtual DN peak signal. The fourth threshold Th4 is set to, for example, six BINs. As described above, on the basis of the frequency differences between the estimated peak signals and the adjacent peak signals, the second frequency difference determining unit 191*a* determines whether to generate virtual peak signals. Therefore, it is possible to reduce erroneous generation of virtual peak signals.

Also, in a case where a frequency difference F2 between the history UP peak signal and the adjacent UP peak signal is equal to or smaller than a fifth threshold Th5, the second frequency difference determining unit 191*a* determines to generate a virtual UP peak signal. Also, the fifth threshold Th5 is set to, for example, six BINs.

Here, the beat signals of the UP section is more likely to be influenced by distance and relative velocity as compared to the beat signals of the DOWN section. For this reason, the history UP peak signal S11 of the UP section and the adjacent UP peak signal are compared, whereby it is possible to more accurately determine whether the targets T corresponding to the history UP peak signal S11 and the adjacent UP peak signal correspond to the same object, for example, a preceding vehicle.

Also, for example, the detecting unit 170 may detect an UP peak signal existing in a range corresponding to twelve BINs having the frequency of the history UP peak signal S11 as the center (six BINs on each side of the low frequency side and the high frequency side), as an adjacent UP peak signal. In this case, it is apparent that a frequency difference F between the history UP peak signal S11 and the adjacent UP peak signal is equal to or smaller than six BINs. Therefore, for example, the second frequency difference determining unit 191*a* may omit determination using the frequency difference F2.

In a case where a distance difference L21 in the left-right direction of the own vehicle C between the target T1 corresponding to the history UP peak signal and the target T2 corresponding to the adjacent UP peak signal is equal to or smaller than a sixth threshold Th6, the second azimuth difference determining unit 191*b* determines to generate a virtual UP peak signal. Also, in a case where a distance difference L22 in the left-right direction of the own vehicle C between the target T1 corresponding to the history DN peak signal and the target T2 corresponding to the adjacent DN peak signal is equal to or smaller than the sixth threshold Th6, the second azimuth difference determining unit 191*b* determines to generate a virtual DN peak signal.

For example, the sixth threshold Th6 may be set to 1.8 m corresponding to the width of the vehicle. A specific method of calculating the distance differences L21 and L22 is the same as the method which is performed by the azimuth difference determining unit 182*c*, and thus will not be described. Therefore, it can be said that the second azimuth difference determining unit 191*b* determines whether to generate virtual peak signals according to the azimuth angle of the peak signals of the history pair and the azimuth angle of the adjacent peak signals. As described above, according to the azimuth angle of the peak signals of the history pair and the azimuth angle of the adjacent peak signals, the second azimuth difference determining unit 191*b* determines whether to generate virtual peak signals. Therefore, it is possible to reduce erroneous generation of virtual peak signals.

The still-object peak determining unit 191*c* determines whether the adjacent UP peak signal and the adjacent DN peak signal are still-object peak signals. Specifically, in a case where the adjacent UP peak signal and the adjacent DN peak signal are peak signals determined as still-object peak signals by the still-object determining unit 140, the still-object peak determining unit 191*c* determines not to generate virtual peak signals. As described above, according to whether the adjacent peak signals are still-object peak signals, the still-object peak determining unit 191*c* determines whether to generate virtual peak signals. Therefore, it is possible to reduce erroneous generation of virtual peak signals. Also, for example, in a case where the detecting unit 170 does not detect still-object peak signals as an adjacent UP peak signal and an adjacent DN peak signal, it is possible to omit determination of the still-object peak determining unit 191*c*.

In a case where all of the second frequency difference determining unit 191*a*, the second azimuth difference determining unit 191*b*, and the still-object peak determining unit 191*c* determine to generate a virtual UP peak signal or a virtual DN peak signal, the generation determining unit 191 determines to perform generation of a virtual UP peak signal or a virtual DN peak signal.

In the present embodiment, in a case where all of the individual units determine to generate virtual peak signals by performing determination on the predetermined conditions, the generation determining unit 191 determines to generate virtual peak signals; however, the present invention is not limited thereto. The generation determining unit 191 may be configured to determine to generate virtual peak signals in a case where at least one of the individual units determines to generate virtual peak signals.

As described above, the generation determining unit 191 can be configured so as not to perform generation of virtual peak signals using peak signals corresponding to the target T2 which is an object different from the target T1 corresponding to the peak signals of the history pair, that is, peak signals less relevant to the peak signals of the history pair. Therefore, the generation determining unit 191 can suppress the accuracy of generation of information on the target T from being decreased by generation of virtual peak signals.

On the basis of the adjacent UP peak signal, the peak generating unit 192 generates a virtual UP peak signal to be used for the information generating unit 200 to generate information on the target T. Also, on the basis of the adjacent DN peak signal, the peak generating unit 192 generates a virtual DN peak signal to be used for the information generating unit 200 to generate information on the target T.

Figure 7:
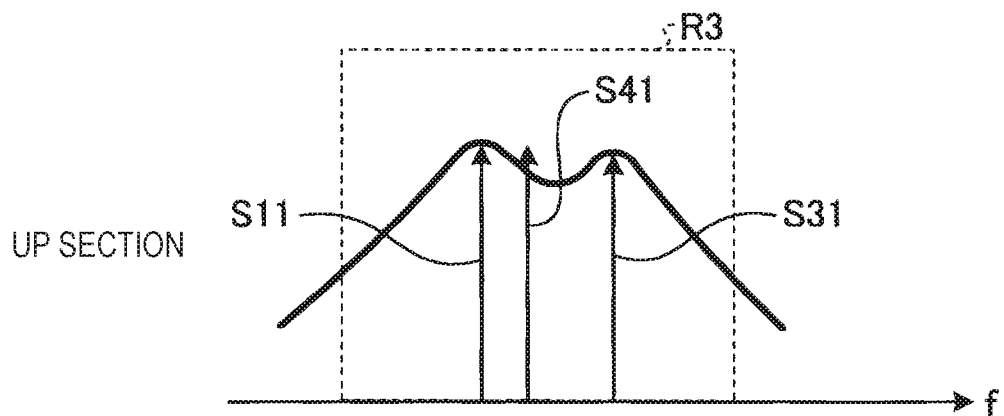
FIG. 7 is a schematic diagram for explaining generation of a virtual UP peak signal which is performed by a peak generating unit.

Hereinafter, generation of a virtual UP peak signal which is performed by the peak generating unit 192 will be described with reference to FIG. 7. Meanwhile, generation of a virtual DN peak signal is the same as that of a virtual UP peak signal, and will not be described. Also, in the present embodiment, the history UP peak signal S11 is included in the history pair. FIG. 7 is a schematic diagram for explaining generation of a virtual UP peak signal which is performed by the peak generating unit 192.

In a case of generating a virtual UP peak signal on the basis of an adjacent peak signal S31 and the history UP peak signal S11, the peak generating unit 192 calculates the center of the beat signal distribution of a predetermined frequency range R3 including the history UP peak signal S11 and the adjacent peak signal S31. The peak generating unit 192 sets the calculated center as a virtual UP peak signal S41.

In the present embodiment, the peak generating unit 192 calculates the center of the signal distribution, thereby capable of generating a virtual UP peak signal S41 according to the signal levels of the history UP peak signal S11 and the adjacent peak signal S31. Therefore, for example, even in a case where the adjacent peak signal S31 is a peak signal corresponding to an object different from that of the history UP peak signal S11, it is possible to reduce influence of the adjacent peak signal S31 on the virtual UP peak signal S41 as compared to a case of simply setting a middle point between the history UP peak signal S11 and the adjacent peak signal S31 as the virtual UP peak signal S41. Therefore, if the peak generating unit 192 calculates the center of the signal distribution, it is possible to reduce influence of erroneous pairs on generation of information on the target T.

Also, in the present embodiment, the peak generating unit 192 calculates the center of the signal distribution; however, the present invention is not limited thereto. For example, the peak generating unit 192 may generate the virtual UP peak signal S41 according to the signal levels of the history UP peak signal S11 and the adjacent peak signal S31.

Therefore, for example, the peak generating unit 192 can also generate the virtual UP peak signal S41 using weighting according to the adjacent peak signal S31. Specifically, for example, the peak generating unit 192 may generate the virtual UP peak signal S41 by weighting the signal levels of the history UP peak signal S11 and the adjacent peak signal S31 and calculating the average of the weighted signal levels. Even if the virtual UP peak signal S41 is generated using weighting according to the virtual port unit 33, similarly in the case of calculating the center, it is possible to reduce influence of erroneous pairs on generation of information on the target T.

The virtual-peak pairing unit 193 performs re-pairing of the virtual UP peak signal S41 calculated by the peak generating unit 192. In a case where the peak generating unit 192 calculates virtual peak signals in both of the UP section and the DOWN section, the virtual-peak pairing unit 193 re-pairs the virtual peak signals. Meanwhile, in a case where the peak generating unit 192 calculates a virtual peak signal in one of the UP section and the DOWN section, the virtual-peak pairing unit 193 re-pairs the virtual peak signal and the history peak signal. The virtual-peak pairing unit 193 outputs the result of the re-pairing to the information generating unit 200.

On the basis of the pair obtained by the re-pairing of the virtual-peak pairing unit 193, the information generating unit 200 generates information on the target T. On the basis of the pairs obtained by recombination of the recombination determining unit 180 or the pair obtained by re-pairing of the virtual-peak pairing unit 193, the information generating unit 200 calculates the distance and relative velocity between the own vehicle C and the target T, as information on the target T.

As described above, the information generating unit 200 can generate information on the basis of the pairs obtained by recombination of the recombination determining unit 180 and re-pairing of the virtual-peak pairing unit 193. Therefore, the information generating unit 200 can generate information on the target T in view of the peak signals existing near the history pair obtained by pairing of the pairing unit 160, and can improve the accuracy of information generation.

The estimating unit 210 generates the next estimated peak signals on the basis of the distance and relative velocity between the own vehicle C and the target T generated by the information generating unit 200.

Figure 8:
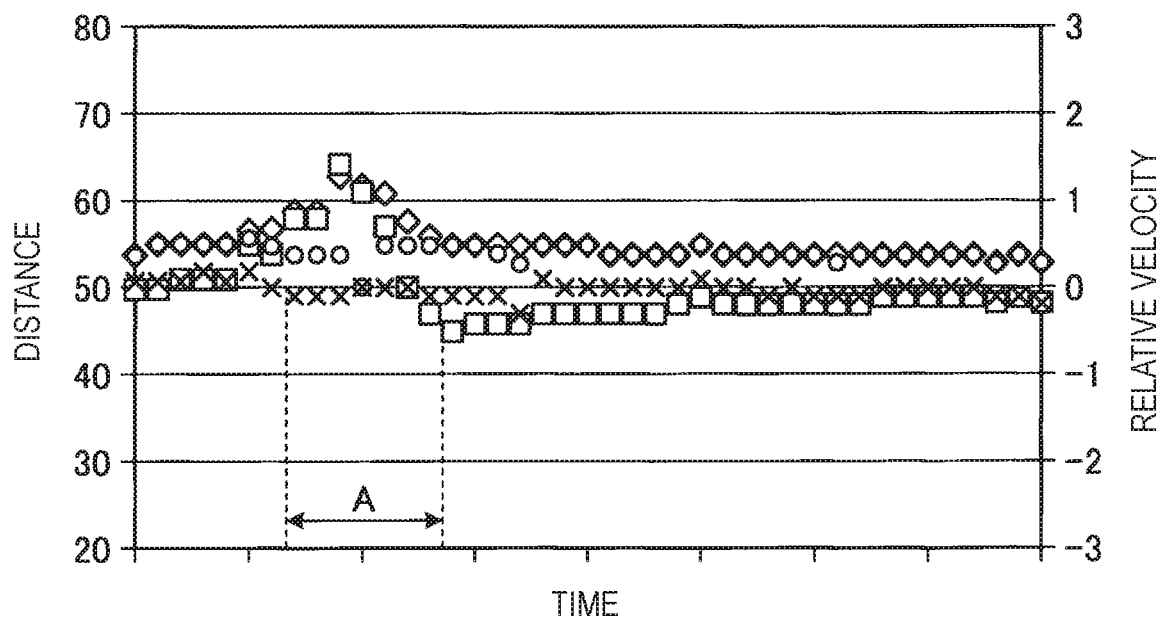
FIG. 8 is a view illustrating the distance and relative velocity of a target.

Now, the effect of the case of generating information on the target T by performing recombination of the history pair using the new pair and re-pairing using the virtual peak signals will be described with reference to FIG. 8. FIG. 8 is a view illustrating the distance and relative velocity of the target T. In a graph shown in FIG. 8, the vertical axes represent distance and relative velocity, respectively, and the horizontal axis represents time. Also, in FIG. 8, white rhomboids (◇) represent the relative velocity in a case where any adjacent peak signal is not used, and white squares (□) represent the distance in a case where recombination of the history pair P1 and generation of virtual peak signals are not performed. Also, white circles (○) represent the relative velocity in a case where recombination of the history pair P1 and generation of virtual peak signals are performed, and crosses (x) represent the distance in a case where recombination of the history pair P1 and generation of virtual peak signals are performed.

As shown in FIG. 8, in the case where the radar device 1 does not perform recombination of the history pair P1 and generation of virtual peak signals, for example, in a section "A", the relative velocity and the distance significantly vary. It can be considered that the reason is that errors are included in the relative velocity and the distance due to mis-pairing of the history UP peak signal and the history DN peak signal.

Meanwhile, in the case where the radar device 1 calculates the distance and the relative velocity by performing recombination of the history pair P1 and generation of virtual peak signals, for example, as shown in the section "A" of FIG. 8, changes in the relative velocity and the distance decrease. It can be considered that the reason is that it is possible to suppress influence of mis-pairing of the history UP peak signal and the history DN peak signal by performing recombination of the history pair P1 and generation of virtual peak signals.

As described above, the radar device 1 according to the present embodiment generates information on the target T by performing recombination of the history pair P1 and generation of virtual peak signals, thereby capable of suppressing influence of mis-pairing of the history UP peak signal and the history DN peak signal.

Figure 9:
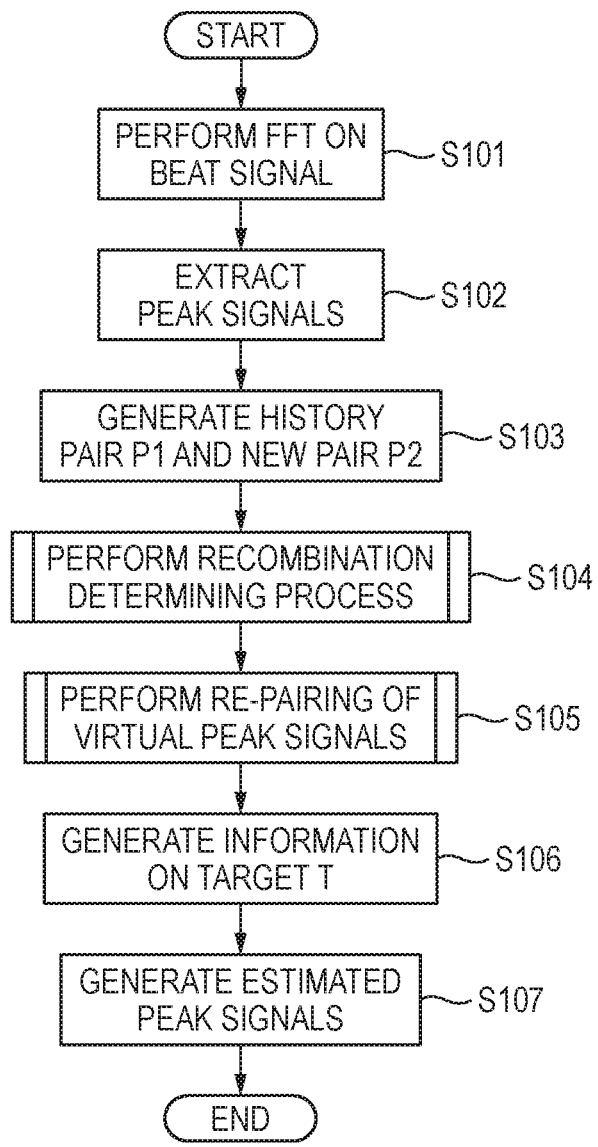
FIG. 9 is a flow chart illustrating the processing procedure of signal processing which is performed by a radar device according to the embodiment of the present invention.

Now, the processing procedure of signal processing which is performed by the radar device 1 according to the embodiment will be described with reference to FIG. 9. FIG. 9 is a flow chart illustrating the processing procedure of the signal processing which is performed by the radar device 1 according to the embodiment.

As shown in FIG. 9, in STEP S101, the FFT processing unit 120 of the radar device 1 performs FFT on the beat signal which a difference signal between the transmission signal and the reception signal received through the receiving antennae Rx. Subsequently, in STEP S102, the peak extracting unit 130 of the radar device 1 extracts peak signals from the beat signal subjected to FFT.

In STEP S103, the pairing unit 160 of the radar device 1 generates the history pair P1 and the new pair P2 by performing pairing on the basis of the peak signals extracted by the peak extracting unit 130. In STEP S104, the recombination determining unit 180 of the radar device 1 performs recombination. Subsequently, in STEP S105, the radar device 1 performs re-pairing of virtual peak signals using the recombined history pair P1.

In STEP S106, on the basis of the history pair P1 obtained by re-pairing the virtual peak signals, the information generating unit 200 generates information on the target T. In STEP S107, the estimating unit 210 estimates the next history peak signals on the basis of the information on the target T, and generates estimated peak signals.

Figure 10:
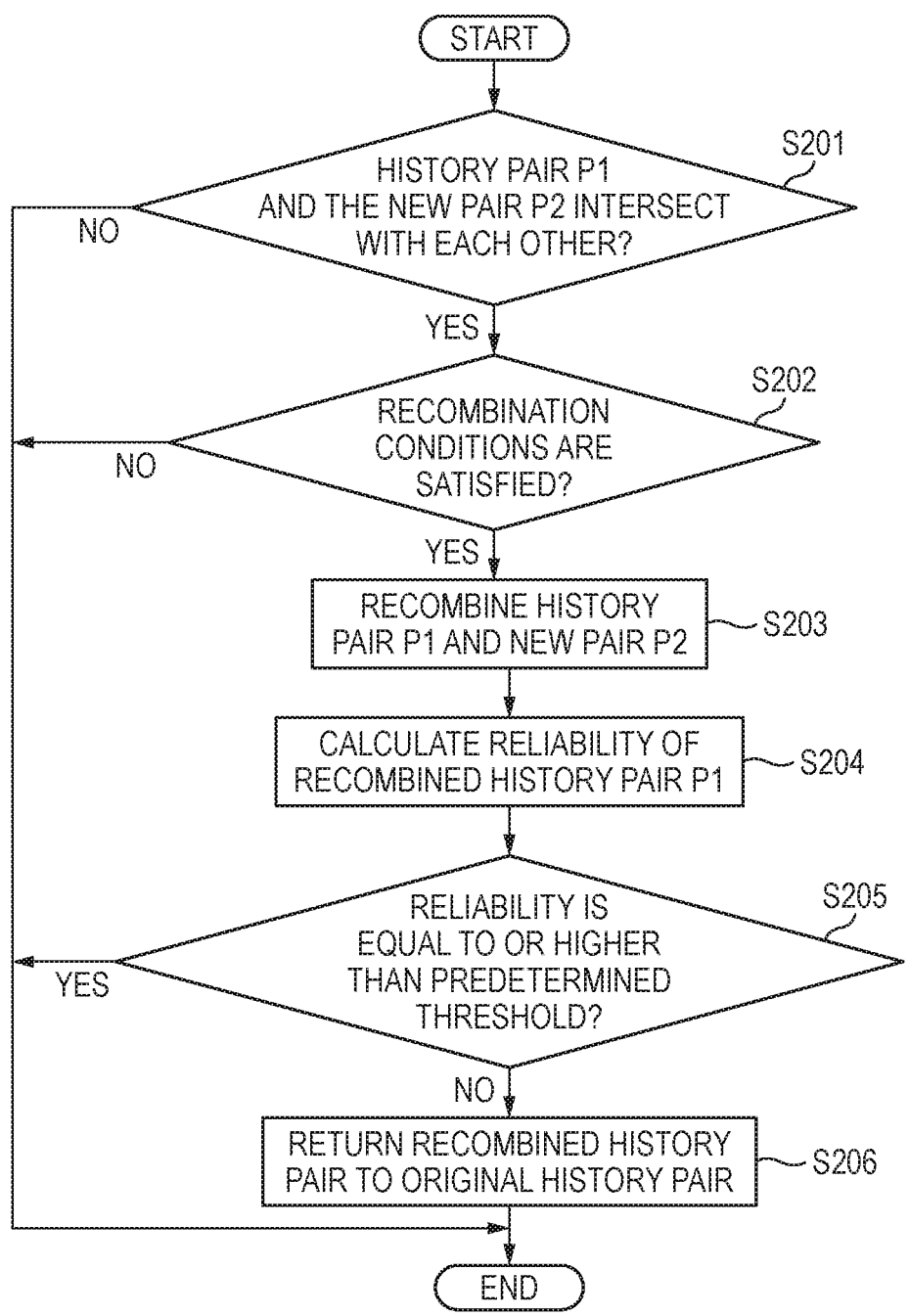
FIG. 10 is a flow chart illustrating the processing procedure of a recombination determining process which is performed by a recombination determining unit of the radar device according to the embodiment of the present invention.

Now, the recombination which is performed in STEP S104 by the recombination determining unit 180 will be described with reference to FIG. 10. FIG. 10 is a flow chart illustrating the processing procedure of the recombination which is performed by the recombination determining unit 180 of the radar device 1 according to the embodiment.

In STEP S201, the recombination determining unit 180 determines whether the history pair P1 and the new pair P2 intersect with each other. In a case where the history pair P1 and the new pair P2 do not intersect with each other ("No" in STEP S201), the recombination determining unit 180 finishes the processing without recombining the history pair P1 and the new pair P2.

Meanwhile, in a case where the history pair P1 and the new pair P2 intersect with each other ("Yes" in STEP S201), in STEP S202, the recombination determining unit 180 determines whether the conditions for recombination of the history pair P1 and the new pair P2 are satisfied. The recombination conditions are conditions on which the change determining unit 182 of the recombination determining unit 180 performs determination.

In a case where any recombination condition is not satisfied ("No" in STEP S202), the recombination determining unit 180 finishes the processing without recombining the history pair P1 and the new pair P2. In a case where the recombination conditions are satisfied ("Yes" in STEP S202), in STEP S203, the recombination determining unit 180 recombines the history pair P1 and the new pair P2.

Subsequently, in STEP S204, the recombination determining unit 180 calculates the reliability of the recombined history pair P1. In STEP S205, the recombination determining unit 180 compares the calculated reliability with the predetermined threshold. In a case where the comparison result is that the reliability is equal to or higher than the predetermined threshold ("Yes" in STEP S205), the recombination determining unit 180 finishes the processing. Meanwhile, in a case where the reliability is lower than the predetermined threshold ("No" in STEP S205), the recombination determining unit 180 returns the recombined history pair P1 to the original history pair in STEP S206, and finishes the processing.

Figure 11:
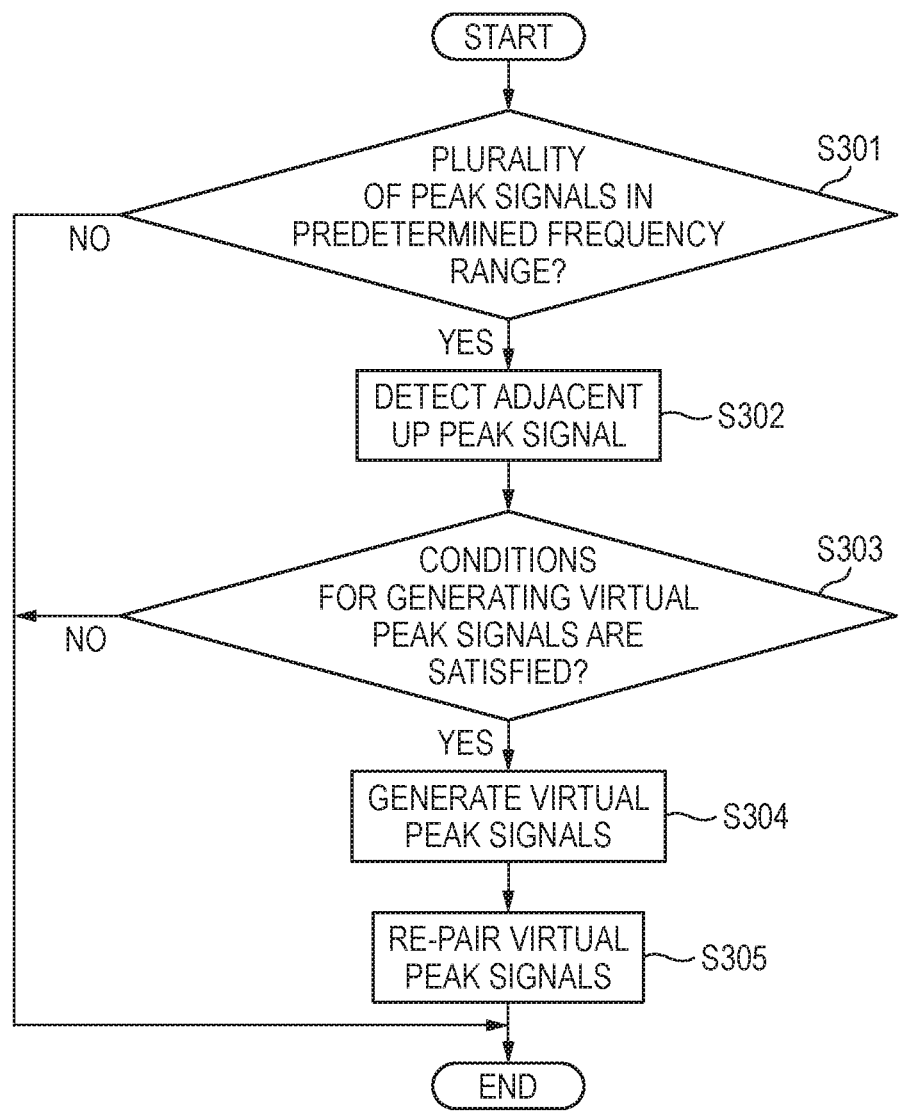
FIG. 11 is a flow chart illustrating the processing procedure of a virtual-peak-signal re-pairing process which is performed by the radar device according to the embodiment of the present invention.

The re-pairing of the virtual peak signals which is performed in STEP S105 by the radar device 1 will be described with reference to FIG. 11. FIG. 11 is a flow chart illustrating the processing procedure of the re-pairing of the virtual peak signals which is performed by the radar device 1 according to the embodiment. Hereinafter, the processing on the UP section will be described; however, the processing is similarly performed even on the DOWN section.

In STEP S301, the radar device 1 determines whether there is a plurality of peak signals in the predetermined frequency range based on the estimated peak signals. In a case where a plurality of peak signals does not exist ("No" in STEP S301), the radar device 1 finishes the processing. In a case where there is a plurality of peak signals ("Yes" in STEP S301), in STEP S302, the detecting unit 170 of the radar device 1 detects the peak signals existing in the predetermined frequency range. In STEP S303, the generating unit 190 of the radar device 1 determines whether the conditions for generating virtual peak signals on the basis of the peak signals detected by the detecting unit 170 are satisfied. The conditions for generating virtual peak signals are conditions on which the generation determining unit 191 performs determination.

In a case where any one of the conditions for generating virtual peak signals is not satisfied ("No" in STEP S303), the radar device 1 finishes the processing. Meanwhile, in a case where the conditions for generating virtual peak signals are satisfied ("Yes" in STEP S303), in STEP S304, the generating unit 190 of the radar device 1 generates virtual peak signals on the basis of the peak signals detected by the detecting unit 170. Then, the radar device 1 performs re-pairing of the generated virtual peak signals in STEP S305, and finishes the processing.

The radar device 1 according to the present embodiment performs recombination of the history pair P1 and generation of virtual peak signals according to the new pair P2 and the adjacent peak signals. However, the present invention is not limited thereto. For example, the radar device 1 may recombine the history pair P1 on the basis of the new pair P2 and the history pair P1, and generate information on the target T on the recombined history pair without detecting adjacent peak signals. Alternatively, the radar device 1 may generate virtual peak signals on the basis of the adjacent peak signals, without performing recombination of the history pair P1 on the basis of the new pair P2, and generate information on the target T on the basis of the generated virtual peak signals. In other words, the radar device may perform either recombination or generation of virtual peak signals, not both of them.

The radar device 1 according to the above-described embodiment includes the extracting unit (the peak extracting unit) 130, the estimating unit 210, the pairing unit 160, the re-pairing unit 220, and the information generating unit 200. The extracting unit (the peak extracting unit) 130 extracts the history peak signals according to the estimated peak signals, from the frequency difference (the frequency beat signal) between the transmission signal in which frequency thereof varies in the predetermined cycle and the reception signal corresponding to the reflected wave of the transmission wave based on the transmission signal from the target T, in the first period (the UP section) when the frequency of the transmission signal increases and the second period (the DOWN section) when the frequency decreases. The estimating unit 210 estimates the current peak signals as the estimated peak signals on the basis of the previous peak signals extracted by the extracting unit 130. The pairing unit 160 pairs the history peak signal of the first period and the history peak signal of the second period. The re-pairing unit 220 re-pairs the history peak signals paired by the pairing unit 160 on the basis of the peak signals existing in the predetermined frequency range R including the history peak signals paired by the pairing unit 160. The information generating unit 200 generates information on the target T according to the result of the pairing of the pairing unit 160 and the result of the re-pairing of the re-pairing unit 220.

As described above, the radar device 1 generates the information on the target T in view of the peak signals existing near the history peak signals paired by the pairing unit 160. Therefore, it is possible to suppress the accuracy of detection of the target T from decreasing due to mis-pairing.

The pairing unit 160 of the radar device 1 according to the above-described embodiment includes a history pair determining unit (the history pair generating unit) 161 and a new pair determining unit (the new pair generating unit) 162. The history pair determining unit 161 determines a history peak pair (the history pair P1) by performing pairing on the basis of the history peak signals extracted by the extracting unit 130. The new pair determining unit 162 determines a new peak pair (the new pair) by performing pairing on the basis of the new peak signals except for the history peak signals.

The re-pairing unit 220 of the radar device 1 further includes the recombination determining unit 180 which recombines the history peak pair and the new peak pair according to the predetermined conditions in the case where the magnitude relation on the frequency axis between the history peak signal of the first period (the UP section) and the history peak signal of the second period (the DOWN section) constituting the history peak pair and the magnitude relation on the frequency axis between the new peak signal of the first period (the UP section) and the new peak signal of the second period (the DOWN section) constituting the new peak pair intersect with each other.

As described above, the radar device 1 can recombine the history peak pair and the new peak pair existing near the corresponding history peak pair, under the predetermined conditions, and can generate information on the target T according to the history peak pair and the new peak pair. Therefore, it is possible to improve the accuracy of detection of the target T.

The recombination determining unit 180 of the radar device 1 according to the above-described embodiment recombines the history peak pair and the new peak pair under the predetermined condition, that is, in a case where the difference ΔD between the distance D1 to the target T1 calculated on the basis of the history peak pair and the distance D2 to the target T2 calculated on the basis of the new peak pair is equal to or smaller than a predetermined value (the first threshold Th1).

Therefore, the radar device 1 can further reduce mis-pairing of the history peak pair.

The recombination determining unit 180 of the radar device 1 according to the above-described embodiment recombines the history peak pair and the new peak pair under the predetermined condition, that is, in a case where the difference F11 between the peak signals of the first period included in the history peak pair and the new peak pair is equal to the difference F12 between the peak signals of the second period included in the history peak pair and the new peak pair.

Therefore, the radar device 1 can further reduce mis-pairing of the history peak pair.

The recombination determining unit 180 of the radar device 1 according to the above-described embodiment recombines the history peak pair and the new peak pair under the predetermined condition, that is, in a case where the differences W11 between the peak signals included in the new peak pair and the estimated peak signals are equal to or smaller than a predetermined value (the second threshold Th2).

Therefore, the radar device 1 can further reduce mis-pairing of the history peak pair.

The recombination determining unit 180 of the radar device 1 according to the above-described embodiment recombines the history peak pair and the new peak pair in a case where the target T according to the new peak pair does not correspond to a still object.

Therefore, the radar device 1 can further reduce mis-pairing of the history peak pair.

The recombination determining unit 180 of the radar device 1 according to the above-described embodiment recombines the history peak pair and the new peak pair according to the azimuth angle corresponding to the history peak pair and the azimuth angle corresponding to the new peak pair.

Therefore, the radar device 1 can further reduce mis-pairing of the history peak pair.

The recombination determining unit 180 of the radar device 1 according to the above-described embodiment recombines the history peak pair and the new peak pair in a case where the reliability of the pairs obtained by recombining the history peak pair and the new peak pair is lower than the predetermined threshold.

Therefore, the radar device 1 can further reduce mis-pairing of the history peak pair.

The re-pairing unit 220 of the radar device 1 according to the above-described embodiment includes the detecting unit 170, a generating unit (the peak generating unit) 192, and the virtual-peak pairing unit 193. The detecting unit 170 detects the peak signals existing in the predetermined frequency range based on the estimated peak signals. The generating unit (the peak generating unit) 192 generates the virtual peak signals on the basis of the peak signals detected by the detecting unit 170 and the history peak signals paired by the pairing unit 160. Also, the virtual-peak pairing unit 193 pairs the virtual peak signals generated by the generating unit (the peak generating unit) 192.

Therefore, the radar device 1 can generate the virtual peak signals on the basis of the peak signals existing near the history peak signals paired by the pairing unit 160, and can generate the information on the target T on the basis of the virtual peak signals. Therefore, it is possible to improve the accuracy of detection of the target T.

The generating unit (the peak generating unit) 192 of the radar device 1 according to the above-described embodiment generates the virtual peak signals according to the center of the peak signals determined by the detecting unit 170 and the history peak signals paired by the pairing unit 160.

Therefore, the radar device 1 can reduce influence of mis-pairing on generation of the information on the target T.

The generating unit (the peak generating unit) 192 of the radar device 1 according to the above-described embodiment generates the virtual peak signals by weighting the history peak signals paired by the pairing unit 160 according to the peak signals detected by the detecting unit 170.

Therefore, the radar device 1 can reduce influence of mis-pairing on generation of the information on the target T.

The generating unit (the peak generating unit) 192 of the radar device 1 according to the above-described embodiment generates the virtual peak signals in a case where the differences W21 and W22 between the peak signals detected by the detecting unit 170 and the current peak signals estimated by the estimating unit 210 are equal to or smaller than a predetermined value (the fourth threshold Th4).

Therefore, the radar device 1 can be configured so as not to perform generation of virtual peak signals using peak signals less relevant to the history peak signals paired by the pairing unit 160, and can suppress the accuracy of generation of information on the target T from being decreased due to generation of virtual peak signals.

The generating unit (the peak generating unit) 192 of the radar device 1 according to the above-described embodiment generates the virtual peak signals in a case where the difference F2 between a peak signal detected by the detecting unit 170 and a history peak signal paired by the pairing unit 160 in the first period is equal to or smaller than a predetermined value (the fifth threshold Th5).

Therefore, the radar device 1 can be configured so as not to perform generation of virtual peak signals using peak signals less relevant to the history peak signals paired by the pairing unit 160, and can suppress the accuracy of generation of information on the target T from being decreased due to generation of virtual peak signals.

The generating unit (the peak generating unit) 192 of the radar device 1 according to the above-described embodiment generates the virtual peak signals in a case where the target T according to the peak signals detected by the detecting unit 170 does not correspond to a still object.

Therefore, the radar device 1 can be configured so as not to perform generation of virtual peak signals using peak signals less relevant to the history peak signals paired by the pairing unit 160, and can suppress the accuracy of generation of information on the target T from being decreased due to generation of virtual peak signals.

The generating unit (the peak generating unit) 192 of the radar device 1 according to the above-described embodiment generates the virtual peak signals on the basis of the azimuth angle corresponding to the peak signals detected by the detecting unit 170 and the azimuth angle corresponding to the history peak signals paired by the pairing unit 160.

Therefore, the radar device 1 can be configured so as not to perform generation of virtual peak signals using peak signals less relevant to the history peak signals paired by the pairing unit 160, and can suppress the accuracy of generation of information on the target T from being decreased due to generation of virtual peak signals.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A radar device comprising at least one hardware processor configured to perform:
   extracting of history peak signals according to estimated peak signals, from a difference frequency between a transmission signal in which a frequency varies in a predetermined cycle and a reception signal obtained by receiving a reflected wave of a transmission wave based on the transmission signal from a target, in a first period in which the frequency of the transmission signal increases and a second period in which the frequency decreases;
   estimating of current peak signals as the estimated peak signals on the basis of previous peak signals extracted;
   pairing of the history peak signal of the first period and the history peak signal of the second period;
   re-pairing of the history peak signals paired, on the basis of peak signals existing in a predetermined range including the history peak signals paired; and
   generating of information on the target on the basis of a result of the pairing and a result of the re-pairing,
   wherein the pairing includes
      determining of a history peak pair by performing pairing on the basis of the history peak signals extracted, and
      determining of a new peak pair by performing pairing on the basis of new peak signals except for the history peak signals, and
   wherein the re-pairing includes recombining of the history peak pair and the new peak pair under a predetermined condition in a case where a magnitude relation on a frequency axis between the history peak signal of the first period and the history peak signal of the second period constituting the history peak pair and a magnitude relation on a frequency axis between the new peak signal of the first period and the new peak signal of the second period constituting the new peak pair intersect with each other.

2. The radar device according to claim 1, wherein the predetermined condition under which the history peak pair and the new peak pair are recombined is a condition in which a difference between a distance to the target calculated based on the history peak pair and a distance to the target calculated based on the new peak pair is equal to or smaller than a predetermined value.

3. The radar device according to claim 1, wherein the predetermined condition under which the history peak pair and the new peak pair are recombined is a condition in which a difference between the peak signals of the first period included in the history peak pair and the new peak pair is substantially equal to a difference between the peak signals of the second period included in the history peak pair and the new peak pair.

4. The radar device according to claim 1, wherein the predetermined condition under which the history peak pair and the new peak pair are recombined is a condition in which differences between the peak signals included in the new peak pair and the estimated peak signals is equal to or smaller than a predetermined value.

5. The radar device according to claim 1, wherein the history peak pair and the new peak pair are recombined in a case where a target according to the new peak pair does not correspond to a still object.

6. The radar device according to claim 1, wherein the history peak pair and the new peak pair are recombined according to an azimuth angle corresponding to the history peak pair and an azimuth angle corresponding to the new peak pair.

7. The radar device according to claim 1, wherein in a case where a reliability of pairs obtained by recombining the history peak pair and the new peak pair is lower than a predetermined threshold, the recombined history peak pair and the recombined new peak pair are returned to original pairs before the recombining.

8. A radar device comprising at least one processor configured to perform:
   extracting of history peak signals according to estimated peak signals, from a difference frequency between a transmission signal in which a frequency varies in a predetermined cycle and a reception signal obtained by receiving a reflected wave of a transmission wave based on the transmission signal from a target, in a first period in which the frequency of the transmission signal increases and a second period in which the frequency decreases;
   estimating of current peak signals as the estimated peak signals on the basis of previous peak signals extracted;
   pairing of the history peak signal of the first period and the history peak signal of the second period;
   re-pairing of the history peak signals paired, on the basis of peak signals existing in a predetermined range including the history peak signals paired; and
   generating of information on the target on the basis of a result of the pairing and a result of the re-pairing,
   wherein the re-pairing further includes
      detecting of the peak signals existing in a predetermined range according to the estimated peak signals,
      generating of virtual peak signals on the basis of the peak signals detected and the history peak signals paired, and
      pairing of the virtual peak signals generated.

9. The radar device according to claim 8, wherein the virtual peak signals are generated according to a center of the peak signals detected and the history peak signals paired.

10. The radar device according to claim 8, wherein the virtual peak signals are generated in a case where a difference between the peak signals detected and the current peak signals estimated is equal to or smaller than a predetermined value.

11. The radar device according to claim 8, wherein the virtual peak signals are generated in a case where a difference between the peak signals detected and the history peak signals paired in the first period is equal to or smaller than a predetermined value.

12. The radar device according to claim 8, wherein the virtual peak signals are generated in a case where a target according to the peak signals detected does not correspond to a still object.

13. The radar device according to claim 8, wherein the virtual peak signals are generated according to an azimuth angle corresponding to the peak signals detected and an azimuth angle corresponding to the history peak signals paired.

14. A signal processing method, performed by at least one processor, comprising:
   extracting of history peak signals according to estimated peak signals, from a difference frequency between a transmission signal in which a frequency varies in a predetermined cycle and a reception signal obtained by receiving a reflected wave of a transmission wave based on the transmission signal from a target, in a first period in which the frequency of the transmission signal increases and a second period in which the frequency decreases;
   estimating of current peak signals as the estimated peak signals on the basis of previous peak signals extracted;
   pairing of the history peak signal of the first period and the history peak signal of the second period;
   re-pairing of the history peak signals paired, on the basis of peak signals existing in a predetermined range including the history peak signals paired; and
   generating of information on the target on the basis of a result of the pairing and a result of the re-pairing,
   wherein the pairing includes
      determining of a history peak pair by performing pairing on the basis of the history peak signals extracted, and
      determining of a new peak pair by performing pairing on the basis of new peak signals except for the history peak signals, and
   wherein the re-pairing includes recombining of the history peak pair and the new peak pair under a predetermined condition in a case where a magnitude relation on a frequency axis between the history peak signal of the first period and the history peak signal of the second period constituting the history peak pair and a magnitude relation on a frequency axis between the new peak signal of the first period and the new peak signal of the second period constituting the new peak pair intersect with each other.

* * * * *